United States Patent
Jiang et al.

(10) Patent No.: US 10,567,779 B2
(45) Date of Patent: Feb. 18, 2020

(54) METHOD AND APPARATUS FOR TRANSCODING

(71) Applicant: Alibaba Group Holding Limited, Grand Cayman (KY)

(72) Inventors: Wenfei Jiang, Hangzhou (CN); Chen Meng, Hangzhou (CN); Yinxiang Pei, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 98 days.

(21) Appl. No.: 16/004,006

(22) Filed: Jun. 8, 2018

(65) Prior Publication Data
US 2018/0295372 A1 Oct. 11, 2018

Related U.S. Application Data

(63) Continuation of application No. PCT/CN2016/107411, filed on Nov. 28, 2016.

(30) Foreign Application Priority Data

Dec. 8, 2015 (CN) .......................... 2015 1 0894540

(51) Int. Cl.
*H04N 7/12* (2006.01)
*H04N 19/40* (2014.01)
(Continued)

(52) U.S. Cl.
CPC ........... *H04N 19/40* (2014.11); *H04N 19/115* (2014.11); *H04N 19/147* (2014.11); *H04N 19/15* (2014.11);
(Continued)

(58) Field of Classification Search
CPC ......... H04N 21/23439; H04N 21/2385; H04N 19/40; H04N 19/124; H04N 19/172;
(Continued)

(56) References Cited

U.S. PATENT DOCUMENTS 8,290,038 B1    10/2012  Wang et al.
10,390,069 B2 *  8/2019  Marchand ........ H04N 21/23439
(Continued)

FOREIGN PATENT DOCUMENTS

| CN | 103220550 | 7/2013 |
| CN | 103702138 | 4/2014 |
| CN | 104581169 | 4/2015 |
| CN | 105100800 | 11/2015 |
| WO | WO2015183910 | 12/2015 |

OTHER PUBLICATIONS

The Extended European Search Report dated Jun. 19, 2019, for European Patent Application No. 16872318.7, 5 pages.
(Continued)

*Primary Examiner* — Gims S Philippe
(74) *Attorney, Agent, or Firm* — Lee & Hayes, P.C.

(57) ABSTRACT

A method and an apparatus for transcoding are disclosed. The method includes obtaining an initial resolution of a media file; determining a first definition level and a second definition level corresponding to the media file; determining a first resolution corresponding to the first definition level and a second resolution corresponding to the second definition level; pre-coding the media file using a first preset rule to obtain a first pre-coding rate corresponding to the first definition level and a second pre-coding rate corresponding to the second definition level based on the first resolution and the second resolution; adjusting the first resolution and the second resolution if the first pre-coding rate is greater than the preset coding threshold; and transcoding the media file using the first preset rule based on the adjusted first resolution and the adjusted second resolution.

20 Claims, 2 Drawing Sheets

(51) Int. Cl.
  *H04N 19/46* (2014.01)
  *H04N 19/59* (2014.01)
  *H04N 21/2343* (2011.01)
  *H04N 19/15* (2014.01)
  *H04N 19/115* (2014.01)
  *H04N 19/147* (2014.01)

(52) U.S. Cl.
  CPC ............. *H04N 19/46* (2014.11); *H04N 19/59* (2014.11); *H04N 21/23439* (2013.01); *H04N 21/234363* (2013.01)

(58) Field of Classification Search
  CPC .................. H04N 19/46; H04N 21/472; H04N 21/47205; H04N 19/114; H04N 19/115; H04N 19/147; H04N 19/15; H04N 19/59; H04N 21/234363; H04L 67/06; G11B 27/031
  USPC ..................................................... 375/240.02
  See application file for complete search history.

(56) References Cited

U.S. PATENT DOCUMENTS

| | | | |
|---|---|---|---|
| 2010/0260043 A1* | 10/2010 | Kimmich | H04L 1/0003 370/229 |
| 2015/0010286 A1* | 1/2015 | Newman | G11B 27/031 386/230 |
| 2015/0150070 A1* | 5/2015 | Gibbon | H04N 21/2385 725/126 |
| 2016/0365123 A1* | 12/2016 | Wang | G11B 20/1262 |
| 2017/0064311 A1* | 3/2017 | Ma | H04L 67/06 |

OTHER PUBLICATIONS

Translation of International Search Report from corresponding PCT application No. PCT/CN2016/107411 dated Mar. 15, 2017, 2 pages.
Translation of Written Opinion from corresponding PCT application No. PCT/CN2016/107411 dated Mar. 15, 2017, 4 pages.

\* cited by examiner

METHOD AND APPARATUS FOR TRANSCODING

CROSS REFERENCE TO RELATED PATENT APPLICATIONS

This application claims priority to and is a continuation of PCT Patent Application No. PCT/CN2016/107411 filed on 28 Nov. 2016, and is related to and claims priority to Chinese Patent Application No. 201510894540.3, filed on 8 Dec. 2015, entitled "Method and Apparatus for Transcoding," which are hereby incorporated by reference in their entirety.

TECHNICAL FIELD

The present application relates to the technical field of information processing, and particularly to transcoding methods and apparatuses.

BACKGROUND

Along with the continuous development of mobile communication technologies, the rapid increase in network access speed, the increasingly intelligence of mobile terminals and the increasingly optimization of data compression technologies, mobile terminals have developed from simple communications and connection tools to multimedia intelligent platforms. Mobile streaming media is a combination of mobile communications and streaming media transmission, and conducts data transmission through a mobile network by using a streaming media technology on a mobile terminal to provide services such as video on demand, mobile video chat, mobile video monitoring, etc., to users.

Transcoding is a process of compressing an extremely large high-resolution media file (e.g., a video file) into a file/stream that is suitable for playing in certain network scenarios (such as an optical network, a WIFI network, a 3G network, etc.), on certain terminals (such as a television, a PC, a mobile phone, a PAD, etc.). Normally, the greater the size of the media file that is compressed, the more suitable the transmission thereof in a limited bandwidth environment is. However, a display quality of the media file may become worse.

Existing transcoding methods usually include setting transcoding parameters corresponding to different definitions in advance. For example, definitions may include four types: smooth definition, standard definition, high definition, and ultra high definition, and resolutions and maximum coding rates corresponding to these four definitions can be configured respectively. According to a predefined resolution and content of a media file, an instant coding rate of the media file is calculated in real time. When the instant rate is greater than a maximum coding rate corresponding to the resolution, the maximum coding rate can be used in place of the instant coding rate to avoid an occurrence of caton phenomenon of the media file, thus ensuring that the media file can be played smoothly.

When implementing a process of the present application, inventors observe that existing technologies have at least the problem as follows. An instant coding rate in the existing transcoding methods is calculated based on a preset resolution and content of a media data. The current content of the media file can be clearly played under two parameters (the preset resolution and the instant coding rate). When the instant coding rate is greater than a maximum coding rate corresponding to the resolution, the maximum coding rate is used for transcoding. Therefore, the media file is ensured to be played smoothly, while failing to ensure the resolution of the content of the media file that is currently played.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

A goal of embodiments of the present application is to provide a method and an apparatus for transcoding to ensure that a media file can be played smoothly and clearly.

In order to solve the above problem, the method and the apparatus for transcoding provided by the embodiments of the present application are implemented as follows.

A transcoding method includes obtaining property information of a media file, the property information including an initial resolution; determining a first definition level corresponding to the media file based on the initial resolution of the media file, preset definition levels and resolution ranges corresponding to the definition levels, and setting the lowest definition level in the preset definition levels as a second definition level corresponding to the media file; using the initial resolution of the media file as a first resolution, and determining a second resolution having a same ranking in a resolution range corresponding to the second definition level based on a ranking of the first resolution in a resolution range corresponding to the first definition level; pre-coding the media file using a first preset rule to obtain a first pre-coding rate corresponding to the first definition level and a second pre-coding rate corresponding to the second definition level based on the first resolution and the second resolution; adjusting the first resolution corresponding to the first definition level and the second resolution corresponding to the second definition level based on the first pre-coding rate and a preset coding rate threshold if the first pre-coding rate is greater than the preset coding threshold; and transcoding the media file using the first preset rule based on the adjusted first resolution and the adjusted second resolution.

A transcoding apparatus includes a media file acquisition module, a definition level determination module, a resolution determination module, a pre-coded coding rate determination module, a resolution adjustment module, and a transcoding module, wherein the media file acquisition module is used for obtaining property information of a media file, the property information including an initial resolution; the definition level determination module is used determining a first definition level corresponding to the media file based on the initial resolution of the media file, preset definition levels and resolution ranges corresponding to the definition levels, and setting the lowest definition level in the preset definition levels as a second definition level corresponding to the media file; the resolution determination module is used for using the initial resolution of the media file as a first resolution, and determining a second resolution having a same ranking in a resolution range corresponding to the second definition level based on a ranking of the first resolution in a resolution range corresponding to the first definition level; the pre-coding rate determination module is used for pre-coding the media file using a first preset rule to obtain a first pre-coding rate corresponding to the first definition level and a second pre-coding rate corresponding to the second definition level based on the first resolution and the second resolution; the resolution adjustment module is used for adjusting the first resolution corresponding to the first definition level and the second resolution corresponding to the second definition level based on the first pre-coding rate and a preset coding rate threshold if the first pre-coding rate is greater than the preset coding threshold; and the transcoding module is used for transcoding the media file using the first preset rule based on the adjusted first resolution and the adjusted second resolution.

As can be seen from the technical solutions provided by the embodiments of the present application, the method and the apparatus for transcoding provided by the embodiments of the present application can determine resolutions of different definition levels based on an initial resolution of a media file, and pre-code the media file based on the determined resolutions. When a coding rate of the pre-coding is greater than a preset coding threshold and thus the media file may not be played smoothly, resolutions corresponding to various definitions are adjusted according to the pre-coded coding rate and the preset coding threshold. Transcoding is then performed on the media file according to the adjusted resolutions, thus ensuring that the media file can be played in a smooth and clear manner.

BRIEF DESCRIPTION OF THE DRAWINGS

In order to describe the embodiments of the technical solutions of present application or the existing technologies in a better manner, accompanying drawings that are needed for description of the embodiments or the existing technologies are briefly described herein. Apparently, the described drawings merely represent some embodiments recorded in the present application. One of ordinary skill in the art can obtain other drawings based on these accompanying drawings without making any creative effort.

DETAILED DESCRIPTION

The embodiments of the present application provide a method and an apparatus for transcoding.

In order to enable one skilled in the art to understand the technical solutions of the present application in a better manner, the technical solutions in the embodiments of the present application are described herein in a clear and complete manner in conjunction with the accompanying drawings in the embodiments of the present application. Apparently, the described embodiments merely represent some and not all of the embodiments of the present application. Based on the embodiments in the present application, all other embodiments that are obtained by one of ordinary skill in the art without making any creative effort shall belong to the scope of protection of the present application.

Figure 1:
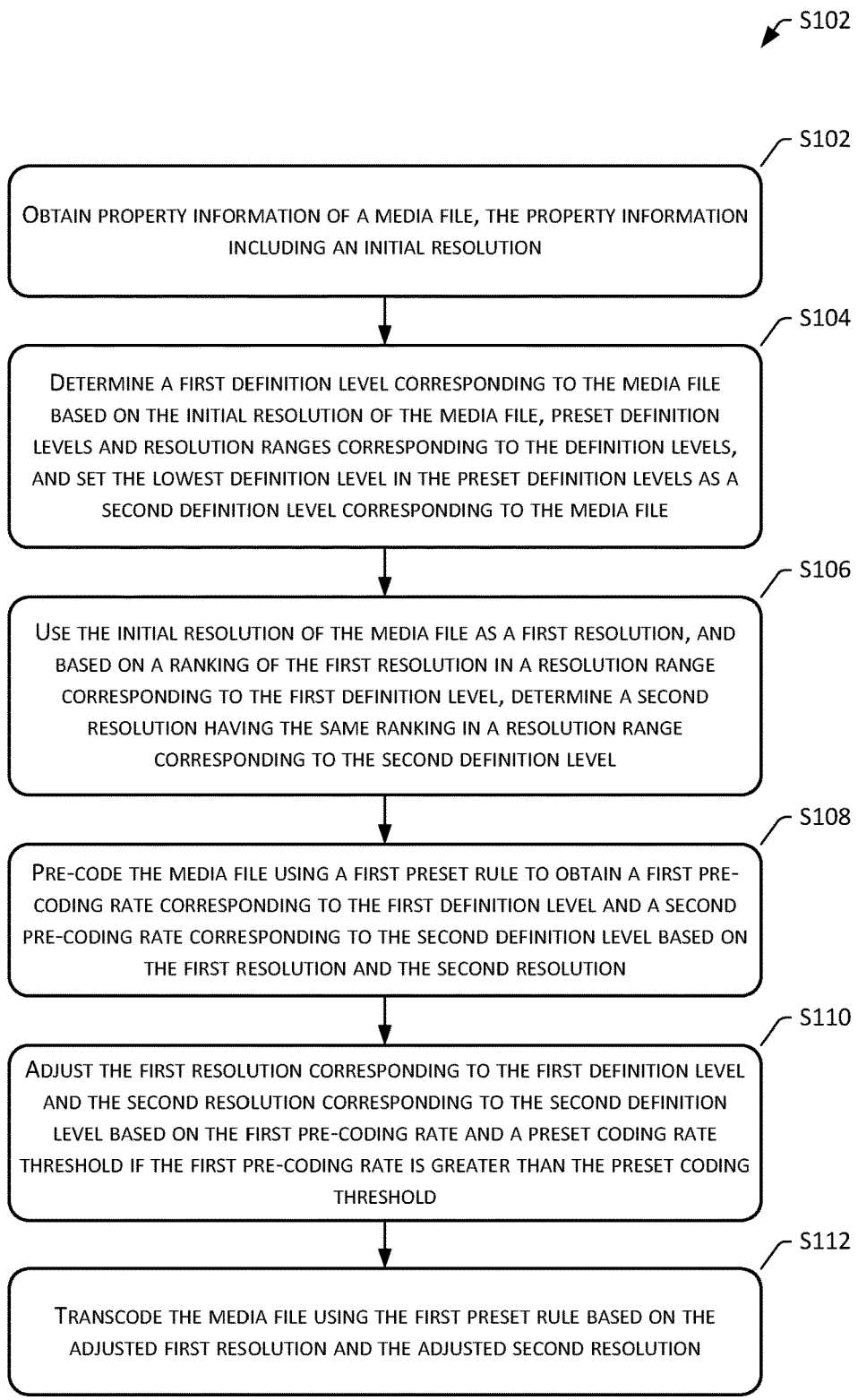
FIG. 1 is a flowchart of an embodiment of a transcoding method of the present application.

FIG. 1 is a flowchart of an embodiment of a transcoding method 100 of the present application. As shown in FIG. 1, the transcoding method 100 may include the following operations.

S102: Obtain property information of a media file, the property information including an initial resolution.

Property information of a media file can be obtained. The media file may be a video file.

The property information may include an initial resolution. The property information may also include an initial resolution of the media file.

S104: Determine a first definition level corresponding to the media file based on the initial resolution of the media file, preset definition levels and resolution ranges corresponding to the definition levels, and set the lowest definition level in the preset definition levels as a second definition level corresponding to the media file.

The preset definition levels may include four definition levels. These four definition levels in an order from the highest definition level from the lowest definition level may be ultra high definition, high definition, standard definition, and smooth definition. Respective resolution ranges and resolution rankings corresponding to the definition levels may be represented by Table 1. A resolution range corresponding to each definition level in Table 1 may include at least three resolutions, which can be arranged in a descending order of the resolutions.

TABLE 1

Definition levels, and corresponding to resolution ranges and resolution rankings

| Definition Level | Resolution Range and Resolution Ranking |
|---|---|
| Ultra high | 1920 × 1080 |
|  | 1728 × 976 |
|  | 1356 × 864 |
| High | 1392 × 784 |
|  | 1136 × 720 |
|  | 1024 × 576 |
| Standard | 944 × 528 |
|  | 848 × 480 |
|  | 768 × 432 |
| Smooth | 624 × 352 |
|  | 540 × 304 |
|  | 480 × 272 |
|  | 400 × 224 |

A first definition level corresponding to the media file can be determined based on the definition levels, and the corresponding resolution ranges and resolution rankings described in Table 1. The first definition level can be used for representing the maximum definition that can be attained by the media file.

A second definition level corresponding to the media file can be the lowest definition level among the preset definition levels. For example, if the preset definition levels in an order from the highest definition level from the lowest definition level are ultra high definition, high definition, standard definition, and smooth definition, the second definition level can be "smooth definition" level.

The first definition level can be determined based on the preset resolution ranges corresponding to the definition levels and the initial resolution of the media file. A definition level corresponding to a resolution range in which the initial resolution is located can be the first definition level. For example, if the initial resolution of the media file is 1920× 1080, the first definition level can be the "ultra high definition" level. If the initial resolution of the media file is 848×480, the first definition level can be the "standard definition" level.

S106: Use the initial resolution of the media file as a first resolution, and based on a ranking of the first resolution in a resolution range corresponding to the first definition level, determine a second resolution having the same ranking in a resolution range corresponding to the second definition level.

The initial resolution of the media file can be treated as a first resolution.

A second resolution corresponding to the second definition level can be determined based on a ranking of the first resolution in a resolution range corresponding to the first definition level. Specifically, a ranking of the second resolution in a resolution range corresponding to the second definition level is the same as the ranking of the first resolution in a resolution range corresponding to the first definition level. For example, the first definition level is the "high definition" level, and the second definition level is the "smooth definition" level. The first resolution is 1392×784, and is located at the first ranking of the resolution range corresponding to the "high definition" level. As such, the second resolution corresponding to the second definition level can be 624×352, and is located at the first ranking of the resolution range corresponding to the "smooth definition" level.

S108: Pre-code the media file using a first preset rule to obtain a first pre-coding rate corresponding to the first definition level and a second pre-coding rate corresponding to the second definition level based on the first resolution and the second resolution.

The media file can be pre-coded using a first preset rule to obtain a first pre-coding rate corresponding to the first definition level and a second pre-coding rate corresponding to the second definition level based on the first resolution and the second resolution.

The preset rule may include pre-coding based on a CRF (constant ratefactor) value or a fixed QP (quantization parameter) value. For example, pre-coding can be performed on video based on CRF=26 or QP=29. In usual situations, a value of 18 for CRF represents that the quality of a media file is basically lossless. A value of 19-21.5 for CRF represents that the quality of media file is of a high quality. A value of 22-26 for CRF represents that the quality of media file is of a medium quality. A value range of QP is generally 0-51. A higher value represents that the quality of a media file is worse. The quality of a media file is very poor if QP>35 for general Internet video files. In implementations, a value range of CRF can be 19-26. In a preferred embodiment, a value range of QP can be 0-35.

In implementations, pre-coding the media file using a first preset rule may also include extracting a plurality of segments from the media file for pre-coding, obtaining an average of coding rates obtained from separately pre-coding the plurality of segments, and using the obtained average as the pre-coding coding rate. By pre-coding the plurality of segments, the time of pre-coding can be saved, and thus a transcoding rate is improved.

S110: Adjust the first resolution corresponding to the first definition level and the second resolution corresponding to the second definition level based on the first pre-coding rate and a preset coding rate threshold if the first pre-coding rate is greater than the preset coding threshold.

A determination is made as to whether the first pre-coding rate is greater than a preset coding threshold corresponding to the first definition level. The preset coding threshold can be the maximum coding value that the media file can be clearly played in the first resolution. If the first pre-coding rate is greater than the preset coding threshold, this represents that the content of the media file cannot be played smoothly when the media file is transcoded according to the first resolution.

If the first pre-coding rate is greater than the preset coding threshold corresponding to the first definition level, the first resolution corresponding to the first definition level and the second resolution corresponding to the second definition level based on the first pre-coding rate can be adjusted based on the first pre-coding rate and the preset coding threshold. Details thereof may include determining a magnitude of reduction of the first resolution and the second resolution based on the preset coding threshold and a preset factor, and determining an adjusted first resolution and an adjusted second resolution based on the magnitude of reduction.

Determining the magnitude of reduction of the first resolution and the second resolution based on the preset coding threshold and the preset factor may include determining whether the first pre-coding rate is greater than or equal to a product of a square of the preset factor and the preset coding threshold, and separately adjusting the first resolution and the second resolution into resolution values that are lower by two rankings in corresponding definition levels if affirmative. A value of the preset factor can be greater than one. In implementations, the value of the preset factor may be 1.1-1.5.

For example, the first resolution is assumed to be 1392×784, and located at the first ranking of the resolution range corresponding to the "high definition" level, and the second resolution is assumed to be 624×352, and located at the first ranking of the resolution range corresponding to the "smooth definition" level. The first pre-coding rate obtained using the first resolution for pre-coding is BitRates, and the preset coding threshold is MaxRate. After determination, BitRates>MaxRate*scale*scale, wherein scale is the preset factor. Therefore, a determination is made that the first resolution and the second resolution are separately adjusted into resolution values that are lower by two rankings in corresponding definition levels. As such, the first resolution and the second resolution after adjustment can be 1356×864 and 480×272 respectively.

Furthermore, if the first pre-coding rate is less than the product of the square of the preset factor and the preset coding threshold, a determination may further be made as to whether the first pre-coding rate is greater than or equal to a product of the preset coding threshold and the preset factor. If affirmative, the first resolution and the second resolution are separately adjusted into resolution values that are lower by one ranking in corresponding definition levels.

Furthermore, if the first pre-coding rate is less than the product of the preset coding threshold and the preset factor, the first resolution and the second resolution may not need to be adjusted.

Adjusting the resolution in a same definition level can ensure that the definition of playing the media file is unchanged. Furthermore, by reducing the resolution, the coding rate after transcoding can be made to be less than the preset coding threshold, thus ensuring that the media file can be played smoothly.

S112: Transcode the media file using the first preset rule based on the adjusted first resolution and the adjusted second resolution.

The media file can be transcoded using the first preset rule based on the adjusted first resolution and the adjusted second resolution. Transcoding the media file using the first preset rule based on the adjusted first resolution and the adjusted second resolution can ensure that the media file is played smoothly and clearly.

In implementations, if the first pre-coding rate is less than or equal to the preset coding threshold corresponding to the first definition level, this can indicate that transcoding based on the first resolution and the second resolution can play the media file smoothly and clearly. Therefore, transcoding can be performed on the media file based on the first resolution and the second resolution.

In implementations, when the definition levels are at least three definition levels and the first definition level is a level having the highest definition in the preset definition levels, the method may further include determining an intermediate resolution corresponding to at least one intermediate definition level between the first definition level and the second definition level, and calculating an intermediate pre-coding rate corresponding to the intermediate definition level using a second preset algorithm based on the first resolution, the second resolution and the intermediate resolution.

Furthermore, the first resolution corresponding to the first definition level and the second resolution corresponding to the second definition level are adjusted based on the first pre-coding rate and the preset coding threshold, the intermediate resolution corresponding to the intermediate definition level can be adjusted. Correspondingly, the media file can be transcoded using the first preset rule based on the adjusted first resolution, the adjusted second resolution and the adjusted intermediate resolution. A method of adjusting the intermediate resolution can be the same as the method of adjusting the first resolution, and is not repeatedly described in the present application herein.

Determining the intermediate resolution corresponding to the at least one intermediate definition level between the first definition level and the second definition level can use the method of determining the second resolution corresponding to the second definition level. Specifically, the intermediate resolution corresponding to the intermediate definition level can be determined based on the ranking of the first resolution in the resolution range corresponding to the first definition level. A ranking of the intermediate resolution in a resolution range corresponding to the intermediate definition level is the same as the ranking of the first resolution in the resolution range corresponding to the first definition level. For example, the first definition level is the "high definition" level, and the second definition level is the "smooth definition" level. As such, at least the "standard definition" level exists between the first definition level and the second definition level. The first resolution corresponding to the first definition level is 1392×784, and is located at the first ranking of the resolution range corresponding to the "high definition" level. As such, the intermediate resolution corresponding to the intermediate definition level can be 944× 528, and is located at the first ranking of the resolution range corresponding to the "standard definition" level.

The second preset algorithm may include an interpolation algorithm. Specifically, a linear relationship between resolutions and pre-coding rates can be calculated based on the first resolution, the second resolution, the first pre-coding rate and the second pre-coding rate. An intermediate pre-coding rate corresponding to the intermediate resolution can be calculated based on this linear relationship. By calculating the intermediate pre-coding rate corresponding to the intermediate resolution of the intermediate definition level using the interpolation algorithm, the pre-coding rate that is obtained can match with the resolution, thus ensuring that the media file can be played smoothly and clearly in the resolution of the intermediate definition level.

The method provided by the embodiments of the present application can determine resolutions of different definition levels based on an initial resolution of a media file, and pre-code the media file based on the determined resolutions. When a coding rate of the pre-coding is greater than a preset coding threshold and thus the media file may not be played smoothly, resolutions corresponding to various definitions are adjusted according to the pre-coded coding rate and the preset coding threshold. Transcoding is then performed on the media file according to the adjusted resolutions, thus ensuring that the media file can be played in a smooth and clear manner.

An embodiment of a transcoding apparatus of the present application is described hereinafter.

Figure 2:
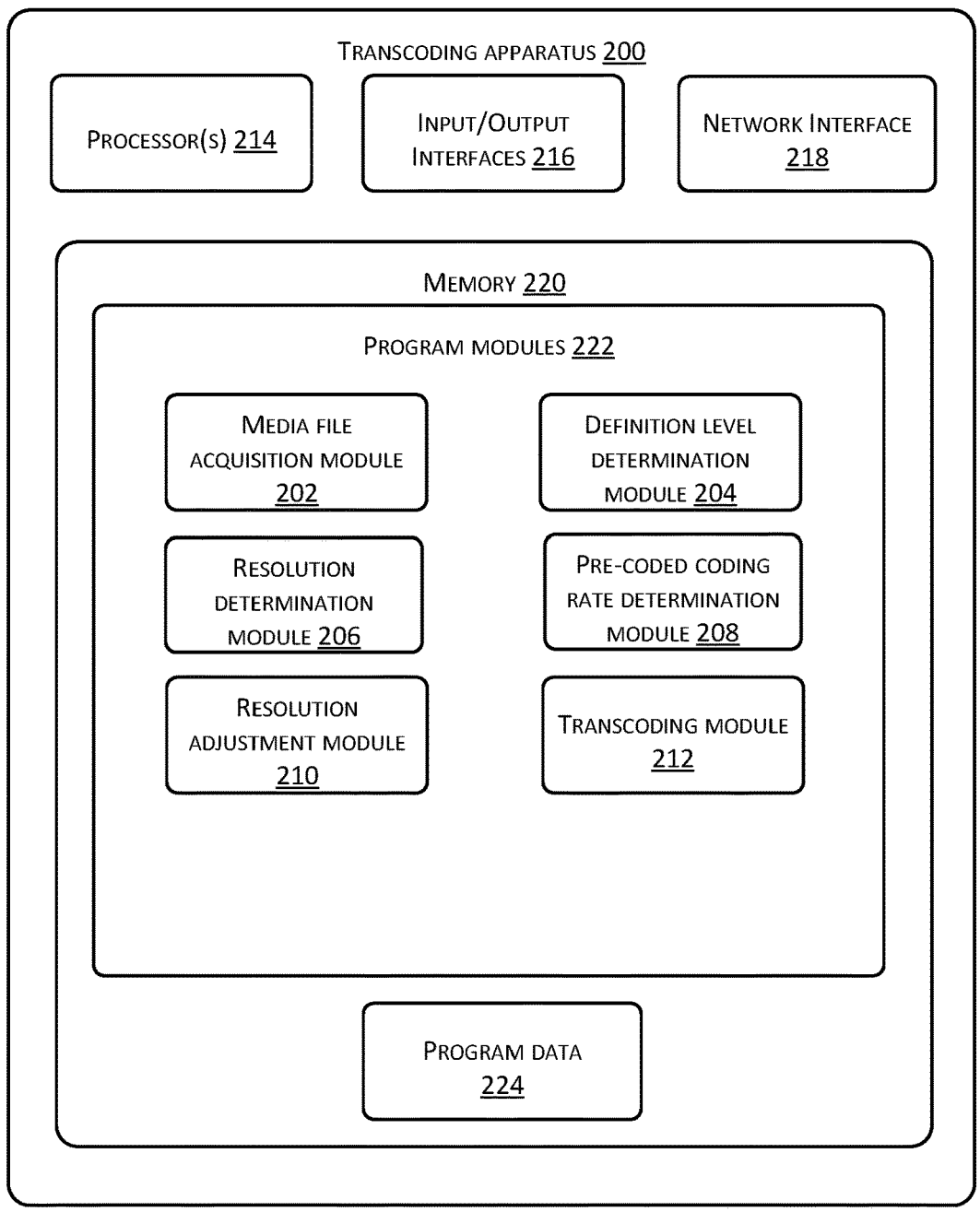
FIG. 2 is a modular diagram of an embodiment of a transcoding apparatus of the present application.

FIG. 2 is a modular diagram of an embodiment of a transcoding apparatus 200 of the present application. As shown in FIG. 2, the transcoding apparatus 200 may include a media file acquisition module 202, a definition level determination module 204, a resolution determination module 206, a pre-coded coding rate determination module 208, a resolution adjustment module 210, and a transcoding module 212.

The media file acquisition module 202 is used for obtaining property information of a media file. The property information may include an initial resolution. The property information may also include an initial coding rate of the media file.

The definition level determination module 204 is used determining a first definition level corresponding to the media file based on the initial resolution of the media file, preset definition levels and resolution ranges corresponding to the definition levels, and setting the lowest definition level in the preset definition levels as a second definition level corresponding to the media file.

The resolution determination module 206 is used for using the initial resolution of the media file as a first resolution, and determining a second resolution having a same ranking in a resolution range corresponding to the second definition level based on a ranking of the first resolution in a resolution range corresponding to the first definition level.

The pre-coding rate determination module 208 is used for pre-coding the media file using a first preset rule to obtain a first pre-coding rate corresponding to the first definition level and a second pre-coding rate corresponding to the second definition level based on the first resolution and the second resolution.

The resolution adjustment module 210 is used for adjusting the first resolution corresponding to the first definition level and the second resolution corresponding to the second definition level based on the first pre-coding rate and a preset coding rate threshold if the first pre-coding rate is greater than the preset coding threshold.

The transcoding module 212 is used for transcoding the media file using the first preset rule based on the adjusted first resolution and the adjusted second resolution.

In implementations, when the first pre-coding rate is less than or equal to the preset coding threshold corresponding to the first definition level, the transcoding module 212 may further be used for transcoding the media file using the first preset rule based o the first resolution and the second resolution.

In implementations, when the definition levels are at least three definition levels and the first definition level is a level having the highest definition in the preset definition levels, the definition level determination module 204 may further be used for determining at least one intermediate definition level between the first definition level and the second definition level. Correspondingly, the resolution determination module 206 may further be used for determining an intermediate resolution corresponding to the at least one intermediate definition level. The pre-coding determination module 208 may further be used for calculating an intermediate pre-coding rate corresponding to the intermediate definition level using a second preset algorithm based on the first resolution, the second resolution and the intermediate resolution.

Furthermore, the resolution adjustment module 210 may further be used for adjusting the intermediate resolution corresponding to the intermediate definition level. The transcoding module 212 may further be used for transcoding the media file using the first preset rule based on the adjusted first resolution, the adjusted second resolution and the adjusted intermediate resolution.

In implementations, the transcoding apparatus 200 may further include one or more processors 214, an input/output (I/O) interface 216, a network interface 218, and memory 220.

The memory 220 may include a form of computer readable media such as a volatile memory, a random access memory (RAM) and/or a non-volatile memory, for example, a read-only memory (ROM) or a flash RAM. The memory 220 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 220 may include program modules 222 and program data 224. The program modules 220 may include one or more of the modules as describe above.

The transcoding apparatus provided by the above embodiment corresponds to the embodiment of the transcoding method of the present application, and can implement the embodiment of the transcoding method of the present application to achieve technical effects of the method embodiment of the present application.

In the 1990s, a technical improvement may be clearly differentiated by hardware improvements (for example, improvements in circuit structures such as diodes, transistors, switches, etc.) or software improvements (improvements in method processes). However, with the development of technologies, many of today's method process improvements can be seen as a direct improvement in hardware circuit architectures. Designers may incorporate improved methods to hardware circuits to get the corresponding hardware circuit structures. Accordingly, a method of process improvement may be achieved with hardware entity modules. For example, a programmable logic device (Programmable Logic Device, PLD) (e.g., Field Programmable Gate Array, FPGA) is one such integrated circuit logic function performed and determined by a user to program the device. With a designer to program a digital system for "integrating" into a PLD on his/her own, it is not necessary to have a chip manufacturer to design and manufacture a dedicated integrated circuit chip. Further, by replacing manually produced integrated circuit chips, this type of programming is also mostly replaced by "logic compiler" software. Similar to a software compiler, such logic compiler compiles original codes written by a specific programming language, which is called a hardware description language (Hardware Description Language, HDL). HDL is not the only one, and there are many kinds, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language), etc. The most common ones are VHDL (Very-High-Speed Integrated Circuit Hardware Description Language) and Verilog. One skilled in the art should understand that a logic method flow may be achieved in hardware circuits by performing a little logic programming and compiling these methods into an integrated circuit using hardware description language.

A controller can be realized in any suitable methods. For example, the controller can be implemented using, for example, a microprocessor or processor with computer-readable media, logic gates, switches, an application specific integrated circuit (ASIC), programmable logic controllers and embedded microcontrollers, that store computer readable program codes (e.g., software or firmware) executable by the (micro)processor. Examples of controllers include, but are not limited to, the following microcontrollers: ARC 625D, Atmel AT91SAM, Microchip PIC18F26K20, and Silicon Labs C8051F320. A controller of memory may also be implemented as a part of control logic of the memory.

One skilled in the art also knows that there are other methods implementing the controller in addition to pure computer readable program codes. Logic programming of the methods may be performed to implement the same functionalities using a way such as controlling logic gates, switches, application specific integrated circuits, programmable logic controllers, and embedded microcontrollers. Therefore, this type of controller may be considered to be a hardware component, and an apparatus that is used for implementing various functions and is included therein can also be considered as a structure inside a hardware component. An apparatus that is used for implementing various functions can be software module(s) implementing the method and/or structure(s) in hardware component(s).

The system, apparatuses, modules, or units described in the above embodiments may be implemented by a computer chip or an entity, or a product having certain functionalities.

For the sake of description, when describing the apparatus, the various units are individually described in terms of functions. Apparently, when the present application is implemented, the functions of various units can be implemented in one or more software components and/or hardware components.

As can be seen from the description of the above implementations, one skilled in the art can clearly understand that the present disclosure can be implemented by software with a necessary universal hardware platform. Based on this understanding, the essence of the technical solutions of the present disclosure, or portions that make contributions to the existing technologies can be manifested in a form of a software product. In a typical configuration, a computing device includes one or more processors (CPU), an output/output interface, a network interface, and memory. The computer software product can include instructions to cause a computing device (which can be a personal computer, a server, or a network device, etc.) to perform methods described in various embodiments or certain portions of the embodiments of the present disclosure. The computer software product can be stored in the memory. The memory may include a form of computer readable media such as a volatile memory, a random access memory (RAM) and/or a non-volatile memory, for example, a read-only memory (ROM) or a flash RAM. The memory is an example of a computer readable media. The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

Various implementations in the specification of the present application are described in a progressive manner. The same and similar parts of the implementations can be referenced with one another. The focus of each implementation is different from those of other implementations. In particular, due to their basic similarities to method implementations, the description of system implementations is relatively simple. References can be made to relevant portions of the method implementations.

The present application can be used in multiple universal or dedicated computing system environments or configurations, for example, a personal computer, a server computer, a handheld device or portable device, a tablet device, a multi-processor system, a microprocessor-based system, a set-top box, a programmable consumer electronic device, a network PC, a small-scale computer, a large-scale computer, and a distributed computing environment including any of the above systems or devices.

The present disclosure may be described in the general context of computer-executable instructions executed by a computer, such as program modules. In general, program modules include routines, programs, objects, components, data structures, etc., that perform specific tasks or implement specific abstract data types. The embodiments of the present disclosure may also be implemented in a distributed computing environment. In these distributed computing environments, tasks are performed by a remote processing device connected via a communication network. In a distributed computing environment, the program modules may be located in local and remote computer storage media, including storage devices.

Although the present application is described using the embodiments, one of ordinary skill in the art can understand that a number of variations and modifications exist in the present application without departing the spirit of the present application. The appended claims are intended to cover these variations and modifications without departing the spirit of the present application.

What is claimed is:

1. A method comprising:
   obtaining property information of a media file, the property information including an initial resolution of the media file;
   determining a first definition level corresponding to the media file based on the initial resolution of the media file, preset definition levels and resolution ranges corresponding to the definition levels, and setting the lowest definition level in the preset definition levels as a second definition level corresponding to the media file;
   using the initial resolution of the media file as a first resolution, and determining a second resolution having a same ranking in a resolution range corresponding to the second definition level based on a ranking of the first resolution in a resolution range corresponding to the first definition level;
   pre-coding the media file using a first preset rule to obtain a first pre-coding rate corresponding to the first definition level and a second pre-coding rate corresponding to the second definition level based on the first resolution and the second resolution;
   adjusting the first resolution corresponding to the first definition level and the second resolution corresponding to the second definition level based on the first pre-coding rate and a preset coding rate threshold if the first pre-coding rate is greater than the preset coding threshold; and
   transcoding the media file using the first preset rule based on the adjusted first resolution and the adjusted second resolution.

2. The method of claim 1, wherein determining the first definition level corresponding to the media file based on the initial resolution of the media file, the preset definition levels and the resolution ranges corresponding to the definition levels comprises a definition level corresponding to a resolution range in which the initial resolution is located being the first definition level.

3. The method of claim 1, wherein pre-coding the media file using the first preset rule comprises performing the pre-coding based on a fixed coding rate factor or a fixed quantization factor.

4. The method of claim 3, wherein pre-coding the media file using the first preset rule further comprises:
   extracting a plurality of segments from the media file for pre-coding;
   obtaining an average of coding values obtained from separately pre-coding the plurality of segments; and
   using the obtained average as the pre-coding rate.

5. The method of claim 1, wherein the preset coding threshold comprises a maximum coding value that the media file is clearly played in the first resolution.

6. The method of claim 1, wherein adjusting the first resolution corresponding to the first definition level and the second resolution corresponding to the second definition level based on the first pre-coding rate and the preset coding rate threshold comprises:
   determining respective magnitudes of reduction of the first resolution and the second resolution based on the preset coding threshold and a preset factor; and
   determining an adjusted first resolution and an adjusted second resolution based on the respective magnitudes of reduction.

7. The method of claim 6, wherein determining the respective magnitudes of reduction of the first resolution and the second resolution based on the preset coding threshold and the preset factor comprises:
determining whether the first pre-coding rate is greater than or equal to a product of a square of the preset parameter and the preset coding threshold; and
adjusting the first resolution and the second resolution to reduce respective rankings of resolution values by two in corresponding definition levels if affirmative.

8. The method of claim 7, wherein: if the first pre-coding rate is less than the product of the square of the preset factor and the preset coding threshold, the method further comprises:
determining whether the first pre-coding rate is greater than or equal to a product of the preset coding threshold and the preset factor; and
adjusting the first resolution and the second resolution to reduce the respective rankings of the resolution values by one in the corresponding definition levels if affirmative.

9. The method of claim 6, wherein a value range of the preset factor includes being greater than one.

10. The method of claim 1, further comprising transcoding the media file based on the first resolution and the second resolution if the pre-coding rate is less than or equal to a preset coding threshold corresponding to the first definition level.

11. The method of claim 1, wherein: when the definition levels are at least three definition levels and the first definition level is a level having the highest definition in the preset definition levels, the method further comprises:
determining an intermediate resolution corresponding to at least one intermediate definition level between the first definition level and the second definition level; and
calculating an intermediate pre-coding rate corresponding to the intermediate definition level using a second preset algorithm based on the first resolution, the second resolution and the intermediate resolution.

12. The method of claim 11, wherein the intermediate resolution corresponding to the intermediate definition level is determined based on a ranking of the first resolution in the resolution range of the first definition level, and a ranking of the intermediate resolution in a resolution range of the intermediate definition level is identical to the ranking of the first resolution in the resolution range of the first definition level.

13. The method of claim 11, wherein the second preset algorithm comprises an interpolation algorithm.

14. An apparatus comprising:
one or more processors;
memory;
a media file acquisition module stored in the memory and executable by the one or more processors to obtain property information of a media file, the property information including an initial resolution of the media file;
a definition level determination stored in the memory and executable by the one or more processors to determine a first definition level corresponding to the media file based on the initial resolution of the media file, preset definition levels and resolution ranges corresponding to the definition levels, and set the lowest definition level in the preset definition levels as a second definition level corresponding to the media file;
a resolution determination module stored in the memory and executable by the one or more processors to use the initial resolution of the media file as a first resolution, and determine a second resolution having a same ranking in a resolution range corresponding to the second definition level based on a ranking of the first resolution in a resolution range corresponding to the first definition level;

a pre-coding rate determination module stored in the memory and executable by the one or more processors to pre-code the media file using a first preset rule to obtain a first pre-coding rate corresponding to the first definition level and a second pre-coding rate corresponding to the second definition level based on the first resolution and the second resolution;

a resolution adjustment module stored in the memory and executable by the one or more processors to adjust the first resolution corresponding to the first definition level and the second resolution corresponding to the second definition level based on the first pre-coding rate and a preset coding rate threshold if the first pre-coding rate is greater than the preset coding threshold; and a transcoding module stored in the memory and executable by the one or more processors to transcode the media file using the first preset rule based on the adjusted first resolution and the adjusted second resolution.

15. The apparatus of claim 14, wherein: when the first pre-coding rate is less than or equal to the preset coding threshold corresponding to the first definition level, the transcoding module is further used for transcoding the media file using the first preset rule based o the first resolution and the second resolution.

16. The apparatus of claim 14, wherein: when the definition levels are at least three definition levels and the first definition level is a level having the highest definition in the preset definition levels,
the definition level determination module is further used for determining at least one intermediate definition level between the first definition level and the second definition level;
the resolution determination module is further used for determining an intermediate resolution corresponding to the at least one intermediate definition level; and
the pre-coding determination module is further used for calculating an intermediate pre-coding rate corresponding to the intermediate definition level using a second preset algorithm based on the first resolution, the second resolution and the intermediate resolution.

17. The apparatus of claim 16, wherein the resolution adjustment module is further used for adjusting the intermediate resolution corresponding to the intermediate definition level, and correspondingly the transcoding module is further used for transcoding the media file using the first preset rule based on the adjusted first resolution, the adjusted second resolution and the adjusted intermediate resolution.

18. One or more computer readable media storing executable instructions that, when executed by one or more processors, cause the one or more processors to perform acts comprising:
obtaining property information of a media file, the property information including an initial resolution of the media file;
determining a first definition level corresponding to the media file based on the initial resolution of the media file, preset definition levels and resolution ranges corresponding to the definition levels, and setting the lowest definition level in the preset definition levels as a second definition level corresponding to the media file;

using the initial resolution of the media file as a first resolution, and determining a second resolution having a same ranking in a resolution range corresponding to the second definition level based on a ranking of the first resolution in a resolution range corresponding to the first definition level;

pre-coding the media file using a first preset rule to obtain a first pre-coding rate corresponding to the first definition level and a second pre-coding rate corresponding to the second definition level based on the first resolution and the second resolution;

adjusting the first resolution corresponding to the first definition level and the second resolution corresponding to the second definition level based on the first pre-coding rate and a preset coding rate threshold if the first pre-coding rate is greater than the preset coding threshold; and transcoding the media file using the first preset rule based on the adjusted first resolution and the adjusted second resolution.

19. The one or more computer readable media of claim 18, wherein pre-coding the media file using the first preset rule comprises:

performing the pre-coding based on a fixed coding rate factor or a fixed quantization factor;

extracting a plurality of segments from the media file for pre-coding;

obtaining an average of coding values obtained from separately pre-coding the plurality of segments; and using the obtained average as the pre-coding rate.

20. The one or more computer readable media of claim 18, wherein: when the definition levels are at least three definition levels and the first definition level is a level having the highest definition in the preset definition levels, the method further comprises:

determining an intermediate resolution corresponding to at least one intermediate definition level between the first definition level and the second definition level; and calculating an intermediate pre-coding rate corresponding to the intermediate definition level using a second preset algorithm based on the first resolution, the second resolution and the intermediate resolution.

* * * * *